(12) United States Patent
Kozlov et al.

(10) Patent No.: US 11,693,125 B2
(45) Date of Patent: Jul. 4, 2023

(54) GNSS RECEIVER ADAPTED TO FIX CROSS-GNSS DD AMBIGUITY

(71) Applicant: Trimble Inc., Sunnyvale, CA (US)

(72) Inventors: Dmitry Gennadievich Kozlov, Moscow (RU); Gleb Aleksandrovich Zyryanov, Moscow (RU)

(73) Assignee: Trimble Inc., Sunnyvale, CA (US)

( * ) Notice: Subject to any disclaimer, the term of this patent is extended or adjusted under 35 U.S.C. 154(b) by 402 days.

(21) Appl. No.: 17/017,287

(22) Filed: Sep. 10, 2020

(65) Prior Publication Data

US 2021/0286090 A1 Sep. 16, 2021

(51) Int. Cl.
*G01S 19/44* (2010.01)
*G01S 19/07* (2010.01)
*G01S 19/04* (2010.01)

(52) U.S. Cl.
CPC ............. *G01S 19/44* (2013.01); *G01S 19/04* (2013.01); *G01S 19/071* (2019.08)

(58) Field of Classification Search
CPC ......... G01S 19/44; G01S 19/071; G01S 19/04
USPC ............. 342/357.42, 357.27, 357.23, 357.44
See application file for complete search history.

(56) References Cited

U.S. PATENT DOCUMENTS

| | | | | |
|---|---|---|---|---|
| 7,432,853 B2* | 10/2008 | Vollath | .................... | G01S 19/44 342/357.27 |
| 7,755,542 B2* | 7/2010 | Chen | ...................... | G01S 19/04 342/357.44 |
| 2012/0092213 A1* | 4/2012 | Chen | ...................... | G01S 19/44 342/26 A |
| 2012/0286991 A1* | 11/2012 | Chen | ...................... | G01S 19/32 342/357.23 |
| 2015/0309177 A1* | 10/2015 | Wallace | ................. | G01S 19/43 342/357.42 |

* cited by examiner

*Primary Examiner* — Bo Fan
(74) *Attorney, Agent, or Firm* — Snell & Wilmer L.L.P.; Kent A. Lembke

(57) ABSTRACT

A Global Navigation Satellite System (GNSS) receiver for processing satellite signals with integer cross ambiguity resolution. The receiver includes an antenna assembly receiving signals from a set of GNSS satellites. The receiver includes a transceiver establishing a communication link with a spaced-apart GNSS receiver and receiving data from the spaced-apart GNSS receiver to make up a base station and rover pair performing DD techniques. The receiver includes a processor and a cross ambiguity fixing module provided by the processor executing code to generate an error correction. The receiver includes an estimator provided by the processor executing code to provide a geographical position solution by DD processing the data from the space-apart GNSS receiver and the signals from the set of GNSS satellites along with the error correction, which may provide a search space with more DD ambiguities or may address quarter or half cycle bias between receiver types.

22 Claims, 10 Drawing Sheets

GNSS RECEIVER ADAPTED TO FIX CROSS-GNSS DD AMBIGUITY

BACKGROUND

1. Field of the Description

The present description relates, in general, to Global Navigation Satellite System (GNSS) receivers to provide higher accuracy (e.g., centimeter-level) positioning. More particularly, the present description relates to a GNSS receiver configured to fix cross-GNSS Double Difference (DD) ambiguity during Real-Time Kinematic (RTK) operations or processing of satellite signals to achieve higher accuracy positioning for the GNSS receiver.

2. Relevant Background

Satellite navigation devices, such as GNSS receivers (which may also be known as Global Positioning System (GPS) receivers or simply GPS), are in wide spread use across the world. These devices are designed to be capable of receiving information from GNSS satellites (e.g., those in the GPS, Global Navigation Satellite System (GLONASS), Galileo, and BeiDou) and to then calculate the device's geographical position.

Many satellite navigation devices are used today in the surveying industry to provide accurate mapping of nearly any physical site. In such situations, high precision (e.g., centimeter-level) positioning is often desirable or even required by the surveying industry. To calculate its geographical position, GNSS receivers are often configured with processors and software to perform differential GPS/GNSS. GNSS receivers use timing signals from at least four satellites to establish position, and errors or delays can occur during the transit of the signals to the GNSS receiver's location. Differential GNSS receivers have been developed to correct these errors and inaccuracies in the GNSS system to allow for more accurate positioning information to be provided by each GNSS receiver.

Differential GPS/GNSS is based on the concept that any two receivers within close proximity to one another will experience the same atmospheric errors. For this reason, differential GPS/GNSS makes use of at least two GNSS receivers. One receiver is located in a precisely known location. This receiver is kept stationary and is used as the base or reference station (or receiver) while the second receiver is moved to other locations and is called the roving receiver or rover. The base receiver is adapted to calculate the difference between its position as calculated by processing received signals from GNSS satellites and its actual or known position. The calculated difference is an error correction factor, which is then transmitted to the roving receiver so that it can operate to correct its calculated locations by subtracting the error correction factor. The corrected location information can be applied in real-time in the field (such as by using radio signals) or in post-processing after data capture.

Accuracy of position calculations for GNSS receivers is further enhanced or achieved in practice by implementing (e.g., in an estimator run by an onboard processor) a Real-Time Kinematic (RTK) positioning technique. RTK is used for applications that require higher accuracies (within 1 centimeter or the like), and RTK uses carrier-based ranging and provides ranges and, therefore, positions that are orders of magnitude more precise than those available through other processes (such as code-based positioning).

As discussed in the above example, though, RTK techniques, while complicated, were based on the concept of reducing and removing errors common to a base station and a rover pair.

In RTK, the range is calculated by determining the number of carrier cycles between the satellite and the roving receiver and this number is multiplied by the known carrier wavelength. The calculated range includes errors from such sources as satellite clock, ephemerides, ionospheric, and tropospheric delays. To eliminate these errors and to take advantage of the precision of carrier-based measurements, RTK requires measurements to be transmitted from the base station to the roving receiver. A complicated process called "ambiguity resolution" is used to determine the number of whole cycles. Despite its complexity, RTK GNSS receivers can resolve the ambiguities almost instantaneously. Roving receivers determine their position using algorithms (in an estimator) that incorporate ambiguity resolution and differential correction.

As will be understood, the position accuracy achieved by the roving receiver or rover depends on the accuracy of the differential correction. While there are industry standards pertaining to counting the number of carrier cycles, these standards only provide guidelines without required specificity to produce identical cycle count estimates. Particularly, the designers and manufacturers of GNSS receivers have implemented the complicated mathematics required to implement a best fit approach or iterative search process in different ways. Since there is no consistent approach to counting cycles (e.g., where the signal origin is located), different GNSS receivers may use different techniques for modeling the carrier wave that leads to different cycle counts and, as a result, different error correction factors. Hence, a pair of GNSS receivers may be unable to perform differential GPS/GNSS with desired precision, which may result in the differential GPS/GNSS failing or being off by one or two cycles (e.g., location being off by the length of a cycle(s) of a carrier wave which is 19 cm long for some satellites).

SUMMARY

Differential GPS/GNSS is useful for eliminating errors. Single difference techniques, such as between receivers single difference, can be used to eliminate like errors in some cases between a rover and a base station pair. However, it is often desirable to utilize double difference (DD) techniques to eliminate additional errors (e.g., with an error correction factor specific to particular satellite signals), but there remain issues in obtaining accurate position data using DD techniques. With this in mind, the inventors designed a GNSS receiver that is configured to fix cross-GNSS DD ambiguity to provide enhanced positioning precision. In some useful embodiments, the new receiver with its software and/or hardware implementing the processes described improves accuracy but, more importantly, improves reliability of position solutions and the time required to reach centimeter level accuracy.

More particularly, a receiver is provided for processing satellite signals with integer cross ambiguity resolution. The receiver is a GNSS receiver and includes an antenna assembly receiving signals from a set of Global Navigation Satellite System (GNSS) satellites. The receiver also includes a transceiver establishing a communication link with a spaced-apart GNSS receiver and receiving data from the spaced-apart GNSS receiver, and, in some applications, the receiver and this spaced-apart GNSS receiver make up a base station and rover pair performing DD techniques. The receiver further includes a processor and a cross ambiguity fixing module provided by the processor executing code to generate an error correction. Still further, the receiver includes logic or an estimator provided by the processor executing code to provide a geographical position solution by processing the data from the space-apart GNSS receiver and the signals from the set of GNSS satellites along with the error correction. In some embodiments, the geographical position solution is obtained by the estimator performing double difference (DD) processing to resolve integer ambiguity.

In some cases, the receiver further includes memory or a data storage device storing an error correction lookup table storing error correction values for a plurality of pairs of receiver types. Then, the data from the spaced-apart GNSS receiver includes a definition of a type of GNSS receiver, and the cross ambiguity fixing module generates the error correction by retrieving one of the error correction values based on the definition of the type of GNSS receiver and on a type of the receiver. In these or other cases, the error correction is selected from the group consisting of: 0 cycle bias, +/−0.25 cycle bias, and 0.5 cycle bias.

In some preferred embodiments, the error correction includes a search space for use in DD processing by the estimator. The search space may include a greater number of DD ambiguities than a conventional Real-Time Kinematic (RTK) search space. In some cases, the search space is formed by selecting a single reference satellite for a group of single difference (SD) ambiguities associated with satellite signals having a predefined nominal frequency. Then, the satellite signals may include at least two different signals on at least two different GNSS constellations. In other cases, though, the search space is formed by selecting one reference satellite for each GNSS signal from the plurality of GNSS satellites and adding DD ambiguity between each pair of the reference satellites. In such cases, the search space can be defined to allow a quarter-cycle ambiguity for the DD ambiguity.

In other embodiments, the search space is defined as a quarter-cycle grid and the geographical position solution is determined in part by performing an integer ambiguity search on the quarter-cycle grid. It should also be understood that all claims made for the quarter-cycle grid are valid for a 0.5 cycle grid. For example, if there is a priori knowledge that bias can only be 0 or 0.5 cycle (i.e., it is a priori knowledge that there can be no +/−0.25 cycle bias) then the ambiguity search is performed on a half-cycle grid.

DETAILED DESCRIPTION

Figure 1:
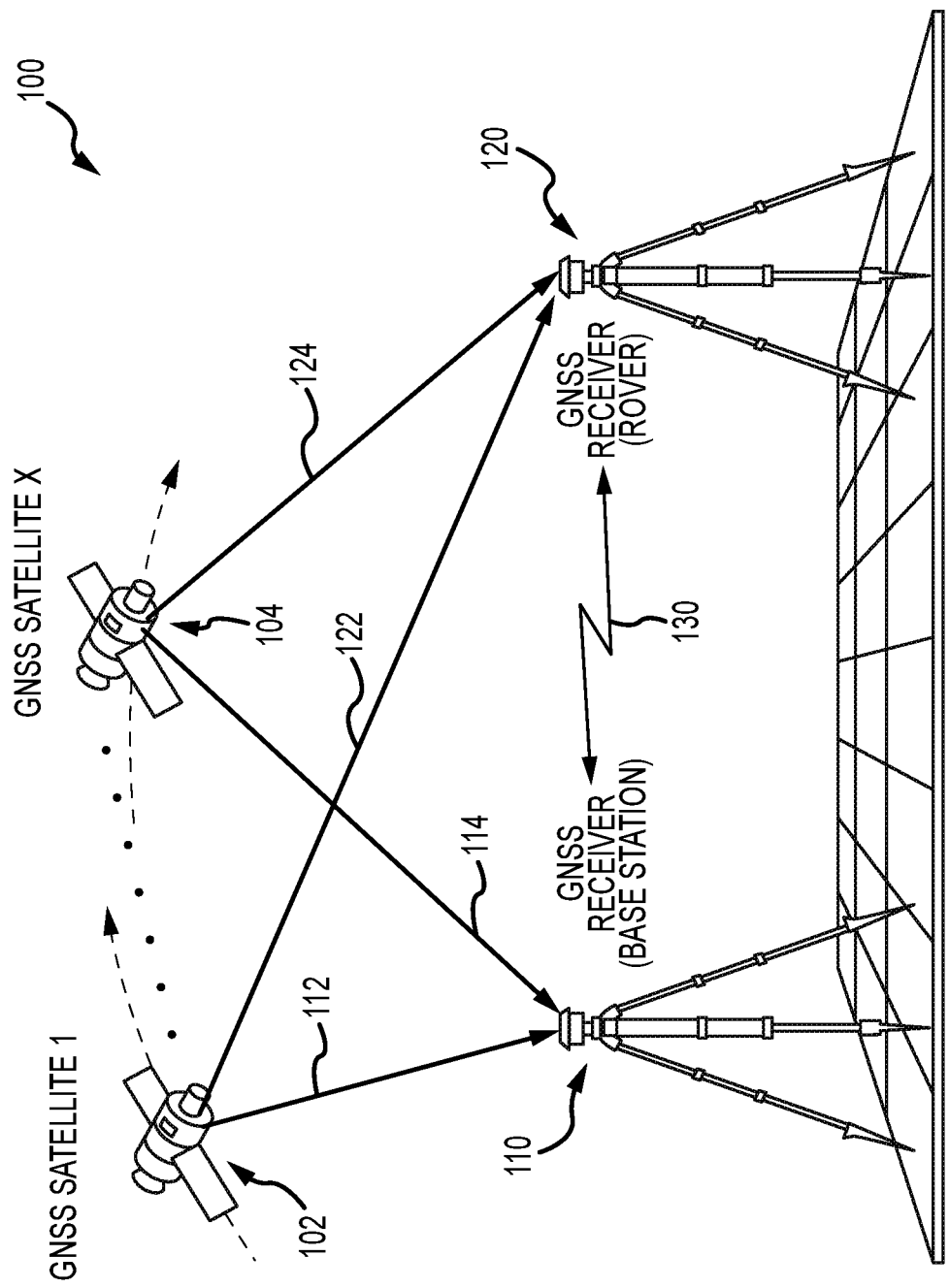
FIG. 1 is a schematic representation of a satellite navigation system with GNSS receivers operable with logic to provide fixing of cross-GNSS DD ambiguity according to the present description.

Briefly, the following description is directed toward methods of fixing cross-GNSS DD ambiguity to provide enhanced positioning precision and toward electronic devices that implement such methods (each which may be labeled "a GNSS receiver" herein). The new method may also be thought of as providing integer cross-ambiguity resolution for unified signals.

Ambiguity search is a crucial part of a precise GNSS positioning. One fundamental idea behind performing the ambiguity search resides in the fact that DD GNSS carrier phase ambiguities are integers. Float estimates of these DD ambiguities may be constrained (e.g., fixed to integer values), and, as a result of a following state-space adjustment, estimated parameters become precise. The new algorithm for use in GNSS receivers does not restrict the formation of generic single-difference (SD) carrier-phase observations. One typically constructs SDs by subtracting base station data from rover data, but formation of the SD is not limited to a difference between two physical receivers. Receiver data may be: physical, virtual (e.g., virtual reference station (VRS), PBS, or the like), a combination of data from multiple receivers (e.g., MAC), and/or presented as a set of state space components.

The method for integer cross-ambiguity resolution provided herein is applicable to receivers (physical or virtual) for which all GNSS carrier-phase observables are controlled by the same receiver clock. This is a typical case for most receivers developed today. The RTCM standard, for example, uses the following words to indicate this: "all GNSS observables are measured at the same instant of receiver time (in other words, if GNSS1 and GNSS2 clocks are based on the same oscillator)." The new method or algorithm deals with search space formation. In this regard, it defines an approach that allows or involves constructing a search space, which would be larger than the one constructed in a conventional DD formation scheme. As a result, the new method or algorithm provides faster ambiguity resolution with higher reliability.

It may be useful to define some of the variables and/or parameters defined and processed to perform the method for integer cross-ambiguity resolution. The method or algorithm takes as input the float estimate of SD ambiguities, $N_{SD}$, and a covariance matrix, $P_{SD}$, corresponding to float SD ambiguities. The algorithm or method creates or generates a DD transformation matrix, F, which creates a DD search space from the SD ambiguities estimates, $N_{SD}$. The method or algorithm generates float estimates of DD ambiguities and then produces a covariance matrix, PDD, corresponding to float ambiguities. The mathematical relationships for these items may be state as follows: $N_{DD}=F \cdot N_{SD}$ and $P_{DD}=F \cdot P_{DD} \cdot F^T$, and the following norm can then be considered: $(N_{DD}-\overline{N}_{DD})^T \cdot P_{DD}^{-1} \cdot (\overline{N}_{DD}-N_{DD})$.

The search procedure analyzes the above-defined norm on an integer grid and finds the optimal estimate. In a simple case, this estimate is a point, $\overline{N}_{DD}$, on an integer grid, which minimizes the above-defined norm. In a more sophisticated implementation of the method or algorithm, a different optimal point may be selected.

The inventors recognized that a conventional RTK GNSS receiver (such as a rover) tries to fix DD carrier phase ambiguity to an integer value for each supported GNSS constellation (such for GPS, GLONASS, and Galileo). A reference satellite is selected independently for each GNSS constellation. In some rare cases, though, a single reference signal is selected for a group of GNSS constellations, which share the same signal type, e.g., GPS+SBAS or GPS+QZSS. It is widely assumed and accepted in the satellite positioning industry that DD ambiguities within each GNSS constellation or system are interoperable (i.e., there is no fractional bias) even when the roving and base station receivers are provided by different manufacturers (or belong to different brands).

However, some GNSS constellations having different signals actually share the same carrier frequency, e.g., L1 frequency band (1575.42), L2 frequency band (1227.60 and 1207.14), and L5 frequency band (1176.45). From generalized considerations, it seems that different GNSS constellations sharing the same carrier signal frequency can be potentially DD-carrier interoperable (i.e., have zero fractional bias) between the GNSS receivers of different vendors. This should be valid across all RINEX (Receiver Independent Exchange Format) signal types provided signal adjustment or reference signal selection follows industry standards for RTK such as those provided by the Radio Technical Commission for Maritime Services (RTCM) in the RTCM-3 phase alignment table or RINEX Table A23 (Version 3.04), which is reproduced below as Table 1.

TABLE 1

Reference Code and Phase Alignment by Constellation and Frequency Band
TABLE A23
Reference Code and Phase Alignment by Frequency Band

| System | Frequency Band | Frequency [MHz] | Signal | RINEX Observation Code | Phase Correction applied to each observed phase to obtain aligned phase. ($\varphi$RINEX = $\varphi$ original(as issued by the SV) + $\Delta\varphi$) |
|---|---|---|---|---|---|
| GPS | L1 | 1575.42 | C/A | L1C | None (Reference Signal) |
| | | | L1C-D | L1S | +¼ cycle |
| | | | L1C-P | L1L | +¼ cycle |
| | | | L1C-(D + P) | L1X | +¼ cycle |
| | | | P | L1P | +¼ cycle |
| | | | Z-tracking | L1W | +¼ cycle |
| | | | Codeless | L1N | +¼ cycle |
| | L2 See Note 1 | 1227.60 | C/A | L2C | For Block II/IIA/IIR - None; For Block IIR-M/IIF/III -¼ cycle See Note 2 |
| | | | Semi-codeless | L2D | None |
| | | | L2C(M) | L2S | -¼ cycle |
| | | | L2C(L) | L2L | -¼ cycle |
| | | | L2C(M + L) | L2X | -¼ cycle |
| | | | P | L2P | None (Reference Signal) |
| | | | Z-tracking | L2W | None |
| | | | Codeless | L2N | None |
| | L5 | 1176.45 | I | L5I | None (Reference Signal) |
| | | | Q | L5Q | -¼ cycle |
| | | | I + Q | L5X | Must be aligned to L5I |
| GLONASS GLONASS | G1 | 1602 + k*9/16 | C/A | L1C | None (Reference Signal) |
| | | | P | L1P | +¼ cycle |
| | G1a | 1600.995 | L1OCd | L4A | None (Reference Signal) |
| | | | L1OCp | L4B | None |
| | | | L1PCd+ L1OCd | L4X | None |
| | G2 | 1246 + k*7/16 | C/A | L2C | None (Reference Signal) |
| | | | P | L2P | +¼ cycle |
| | G2a | 1248.06 | L2CSI | L6A | None (Reference Signal) |
| | | | L2OCp | L6B | None |
| | | | L2OSI+ L2OCp | L6X | None |
| | G3 | 1202.025 | I | L3I | None (Reference Signal) |
| | | | Q | L3Q | +¼ cycle |
| | | | I + Q | L3X | Must be aligned to L3I |
| Galileo | E1 | 1575.42 | B1/NAVOS/ CS/SoL | L1B | None (Reference Signal) |

TABLE 1-continued

Reference Code and Phase Alignment by Constellation and Frequency Band
TABLE A23
Reference Code and Phase Alignment by Frequency Band

| System | Frequency Band | Frequency [MHz] | Signal | RINEX Observation Code | Phase Correction applied to each observed phase to obtain aligned phase. ($\varphi$RINEX = $\varphi$ original(as issued by the SV) + $\Delta\varphi$) |
|---|---|---|---|---|---|
| | | | C no data | L1C | +¼ cycle |
| | | | B + C | L1X | Must be aligned to L1B |
| | E5A | 1176.45 | I | L5I | None (Reference Signal) |
| | | | Q | L5Q | -¼ cycle |
| | | | I + Q | L5X | Must be aligned to L5I |
| | E5B | 1207.140 | I | L7I | None (Reference Signal) |
| | | | Q | L7Q | -¼ cycle |
| | | | I + Q | L7X | Must be aligned to L7I |
| | E5(A + B) | 1191.795 | I | L8I | None (Reference Signal) |
| | | | Q | L8Q | -¼ cycle |
| | | | I + Q | L8X | Must be aligned to L8I |
| | E6 | 1278.75 | B | L6B | None (Reference Signal) |
| | | | C | L6C | -¼ cycle |
| | | | B + C | L6X | Must be aligned to L6B |
| QZSS | L1 | 1575.42 | C/A | L2C | None (Reference Signal) |
| | | | L1C(D) | L1S | +¼ cycle (See Note 5 Below) |
| | | | L1C(P) | L1L | +¼ cycle |
| | | | L1C-(D + P) | L1X | +¼ cycle |
| | | | L1S | L1Z | N/A |
| | L2 | 1227.60 | L2C (M) | L2S | None (Reference Signal) |
| | | | L2C(L) | L2L. | None |
| | | | L2C (M + L) | L2X | None |
| | L5 | 1176.45 | I | L5I | None (Reference Signal) |
| | | | Q | L5Q | -¼ cycle |
| | | | I + Q | L5X | Must be aligned to L5I |
| | L5S | 1176.45 | I | L5D | None (Reference Signal) |
| | | | Q | L5P | -¼ cycle |
| | | | I + Q | L5Z | None must be aligned to L5D |
| | L6 (See Note 6 Below) | 1278.75 | L6D | L6S | None (Reference Signal) |
| | | | L6P | L6L | None |
| | | | L6(D + P) | L6X | None |
| | | | L6E | L6E | None |
| | | | L6(D + E) | L6Z | None |
| BDS | B1-2 | 1561.098 | I | L2I | None (Reference Signal) (See Note 4 Below) |
| | | | Q | L2Q | -¼ cycle |
| | | | I + Q | L2X | Must be aligned to L2I |
| | B1 | 1575.42 | Data (D) | L1D | None Reference Signal |
| | | | Pilot (P) | L1P | +¼ cycle (preliminary) |
| | | | D + P | L1X | Must be aligned to L1D |
| | B2a | 1176.45 | Data (D) | L5D | None Reference Signal |
| | | | Pilot (P) | L5P | +¼ cycle (preliminary) |
| | | | D + P | L5X | Must be aligned to L5D |
| | B2b (BDS-2) | 1207.140 | I | L7I | None (Reference Signal) |
| | | | Q | L7Q | -¼ cycle |
| | | | I + Q | L7X | Must be aligned to L7I |
| | B2b (BDS-3) | 1207.140 | Data (D) | L7D | None Reference Signal |
| | | | Pilot (P) | L7P | +¼ cycle (preliminary) |
| | | | D + P | L7Z | Must be aligned to L7D |
| | B2a + B2b | 1191.795 | Data (D) | L8D | None Reference Signal |
| | | | Pilot (P) | L8P | +¼ cycle (preliminary) |
| | | | D + P | L8X | Must be aligned to L8D |
| | B3 | 1268.52 | I | L6I | None (Reference Signal) |
| | | | Q | L6Q | -¼ cycle |
| | | | I + Q | L6X | Must be aligned to L6I |
| | | | B3A | L6A | Must be aligned to L6I |
| IRNSS | L5 | 1176.45 | A SPS | L5A | None (Reference Signal) |
| | | | B RS(D) | L5B | Restricted (See Note 3) |
| | | | C RS(P) | L5C | None |
| | | | B + C | L5X | Must be aligned to L5A |
| | S | 2492.028 | A SPS | L9A | None (Reference Signal) |
| | | | B RS(D) | L9B | Restricted (See Note 3) |
| | | | C RS(P) | L9C | None |
| | | | B + C | L9X | Must be aligned to L9A |

Regarding signal adjustment (or reference signal selection), the method/algorithm can be implemented by recognizing that for the GPS L1 band, any DD carrier combination between the following signals should be integer: GPS L1, SBAS L1, QZSS L1, Galileo E1, and BeiDou B1C (phase III), and this provides four extra integer DD combinations. Similarly, for the GPS L2 band, any DD carrier combination between the following signals should be integer (to provide one extra integer DD combination): GPS L2 and QZSS L2. Likewise, for the GPS L5 band, any DD carrier combination between the following signals should integer (to provide five extra integer DD combinations): There also will be more different GNSS signals for use in the future that share the same carrier frequency, e.g., Galileo E5 (A+B) and BeiDou B2 (A+B).

The above examples are augmented by the more complete table below, i.e., Table 2, showing frequencies that are shared by at least two different GNSS signals (where carrier names L1, L2, L5, L6, L7, and L8 follow the RINEX-3 naming convention).

TABLE 2

Pairs of GNSS Signals with Shared Frequency

|  | L1 (1575.42) | L2 (1227.60) | L5 (1176.45) | L6 (1278.75) | L7 (1207.140) | L8 (1191.795) |
|---|---|---|---|---|---|---|
| GPS | X | X | X |  |  |  |
| GAL | X |  | X | X | X | X |
| BDS | X |  | X |  | X (II) X (III) (*) | X |
| QZS | X | X | X | X |  |  |
| IRN | (**) |  | X |  |  |  |
| SBA | X |  | X |  |  |  |

In Table 1, both the BDS phase II and the BDS phase III have signals on the L7 frequency (as indicated with "*"), and the IRNSS will later transmit on L1 (as indicated with "**"). Also, the GLONASS FDMA/CDMA is the only GNSS constellation having unique frequencies that are not shared with other GNSS constellations. It was clear to the inventors that the GPS L1 and GPS L5 frequency bands are very rich with different GNSS signals.

With this in mind, the concept of "cross-GNSS DD ambiguity" (or, more simply, "cross ambiguity") was created to refer to any DD carrier combination applying different GNSS systems with the same carrier frequency nominal. However, neither RINEX nor RTCM provided any requirements or standards that cross ambiguity must be integer. The inventors performed testing to create zero baseline records using receivers of different types (e.g., brands and designs (e.g., with differing logic producing ambiguity searches or solutions)) to determine actual values of several cross ambiguities, with RTCM-3 and/or RINEX-3 data typically being recorded.

With the collected or actual data in hand, the inventors determined a number of findings that can be used to fix cross ambiguity. First, different signals from different GNSS constellations that share the same frequency are generally compatible up to a quarter (or 0.25) cycle, with DD ambiguities sometimes happening to be non-integer but being stable in time and repeatable from test to test. Second, signals from different GNSS constellations that share the same signal may still have non-integer (typically half-cycle) bias, with this being recently discovered for GPS+QZSS-L2 and long ago for GPS+SBAS-L1. Third, in harsh environments with limited satellite visibility, these extra combinations will increase fixed-RTK/Precise Point Positioning (PPP) solution availability and reliability. In particular, the following combinations of satellites could now be used to achieve a fixed-RTK solution: (a) 2 GPS satellites+2 GAL satellites+1 BDS satellite (without redundancy); (b) 2 GPS satellites+2 GAL satellites+2 BDS satellites (with redundancy); (c) 1 GPS satellite+1 QZS+1 GAL satellite+1 BDS satellite (without redundancy); and (d) 1 GPS satellite+1 QZS satellite+1 GAL satellite+2 BDS satellite (with redundancy).

In brief, the new method or algorithm implemented in the GNSS receivers of the present description performs fixing cross ambiguity in several new ways. First, cross-GNSS ambiguities can be used in RTK/PPP ambiguity fixing procedures. Second (or as a second scheme), in the new method/algorithm, inclusion of cross-GNSS ambiguities into the search will: (a) increase fixed-RTK/PPP availability in harsh environments; and (b) improve fixed-RTK/PPP reliability in harsh environments.

Third, the inclusion or use of cross-GNSS ambiguities can be achieved by using one or more of the following three approaches (or a combination of these three approaches). First, it may be useful to add a priori unknown cross-DD ambiguities into a conventional search space with a resolution of a quarter cycle (0.25 cycle). This likely will result in inter-GNSS ambiguities remaining integer, and the whole search space is performed on 0.25-cycle net with additional integer-cycle inter-GNSS validation, which may be applied for increasing reliability. Second, it may be useful to correct cross-DD ambiguities by a priori known fractional bias and add them into a conventional search space with a resolution of one cycle. This can be achieved, for example, by detecting proprietary differential protocol or analyzing reference receiver type information (e.g., using the RTCM 1033 message). Third, it may be useful to estimate the fractional bias in cross-DD ambiguities while working in a conventional RTK/PPP and then calibrating this bias and applying the above-described second scheme after a successful on-the-fly calibration. This approach can be applied for signals at adjacent frequencies, which do not match but are located close enough to ensure the usage of the same RF and, thus, ensuring a very slow bias dynamic. In this case, biases can be of arbitrary non-integer value and may be varying slowly due to the temperature (over a short timespan) and components' ages (over a long timespan).

FIG. 1 illustrates generally a satellite navigation system 100 that may be used to implement the methods and algorithms described herein to provide integer cross ambiguity resolution for unified signals (so that the methods/algorithms each may be thought of as an ICARUS method or implementation). The system 100 includes a plurality of GNSS satellites 102, 104 from one or more GNSS constellations or systems. The system 100 further includes a first GNSS receiver 110 that is positioned at a known location and is acting as a base receiver or base station and a second receiver 120 that may be moved by an operator relative to the base station 110 and is acting as a roving receiver or rover. The GNSS receivers 110, 120 may take the form of nearly any on-the-market GNSS receiver or yet to be developed and distributed GNSS receiver including standalone models used in surveying applications (as shown) or those built into other electronic devices (such as automotive vehicles, smartphones/devices, and the like). As shown with arrows 130, a real-time communication channel connects the base and roving receivers 110, 120 (e.g., each includes wireless communication components such as transceivers to provide the communication channel 130).

During operations, the receivers 110, 120 each receive signals 112, 114, 122, and 124 from the visible GNSS satellites 102, 104. Further, the two receivers 110, 120 are configured with logic or executing code/software to provide the positioning techniques described herein including fixing cross-GNSS DD ambiguity using the ICARUS method. In brief, each is configured to perform SD and DD techniques (e.g., between receivers single difference, between satellites singles difference, and the combination of these two single differences to provide double differences) to estimate the cycle counts as part of their positioning processes. Further, each of the receivers 110, 120 is adapted to implement the ICARUS method/algorithm for fixing cross ambiguity, and the communications on channel 130 may include error correction factors and/or bias values for use by their estimators (as input) in achieving more accurate positioning. Each receiver 110, 120 may use new and/or expanded search spaces (may be labeled "an ICARUS search space") for resolving or fixing ambiguity, and the error correction factors may include data from an alignment or lookup table chosen based on identification of the receiver type (e.g., defined in some cases by brand or producer) in the receiver pair 110 and 120.

Figure 2:
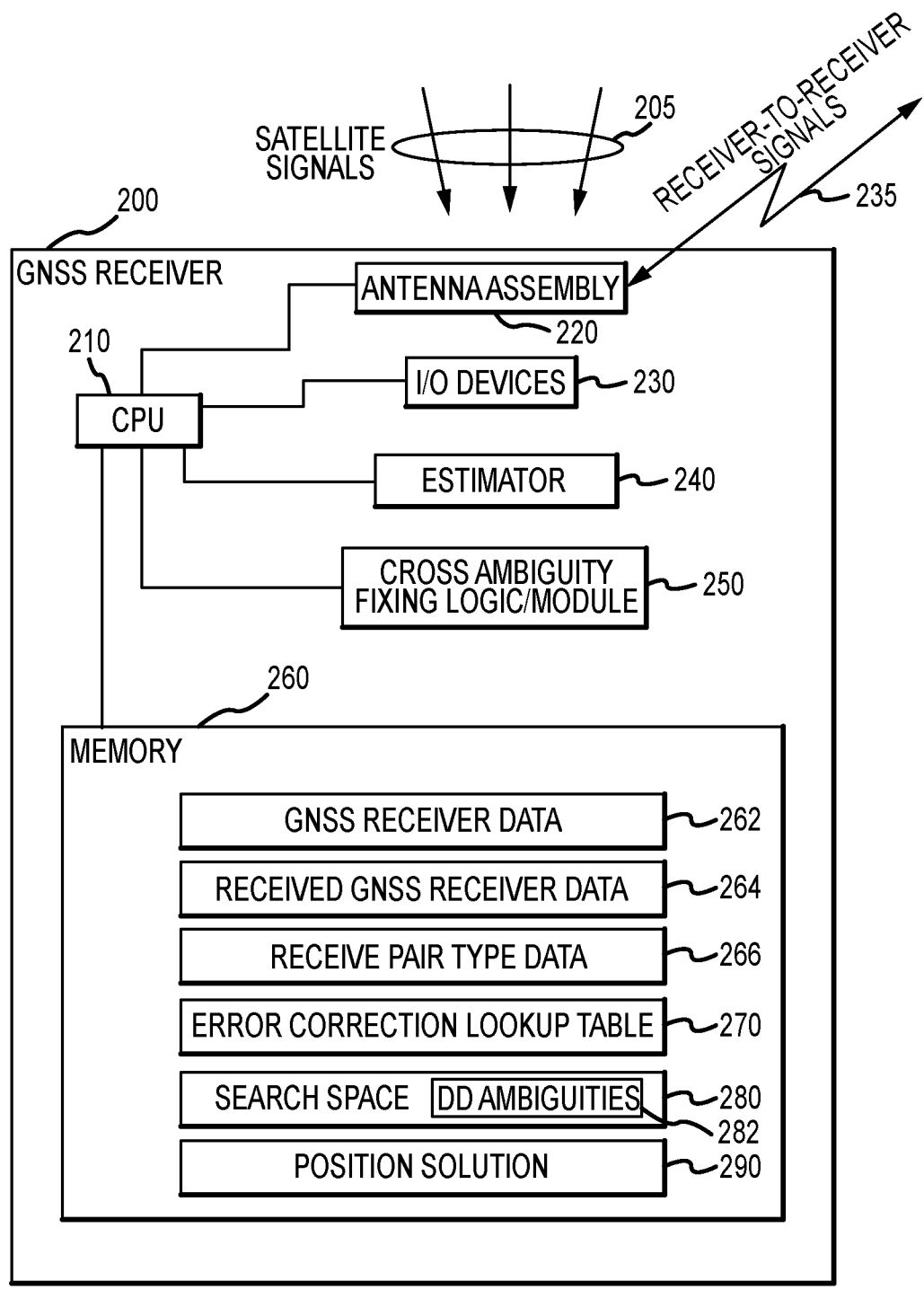
FIG. 2 is a functional block diagram of a GNSS receiver, which may be used in the system of FIG. 1, configured with (or to run) cross ambiguity fixing logic of the present description.

FIG. 2 is a functional block diagram of a GNSS receiver 200, which may be used in the system of FIG. 1, configured with (or to run) cross ambiguity fixing logic 250 of the present description. The GNSS receiver 200 may take the form of nearly any electronic device configured to determine geographical location based on receipt and processing of signals from a set of GNSS satellites such as a GNSS receiver used in surveying applications. The GNSS receiver 200 includes a processor(s) 210 managing operations of an antenna assembly 220 configured to receive signals 205 from visible satellites in one, two, or more GNSS systems or constellations. This data may be stored by the processor 210 in onboard memory 260 as shown as GNSS receiver data 262, and it should be noted that the receiver 200 may be used as a standalone GNSS receiver or, as is often the case, a base receiver or a roving receiver.

The receiver 200 further includes input/output (I/O) devices 230 whose operations are also managed by the processor 210, and the I/O devices 230 include wireless communication components allowing the GNSS receiver 200 to communicate with other GNSS receivers (not shown) such that the GNSS receiver 200 may act as a base station or rover in a surveying pair to support SD and DD positioning techniques to be performed. In this regard, the other GNSS receiver may transmit its collected data in messages/signals, and this data may be stored as shown at 264 in the memory 260 by the processor 210. Further, as discussed throughout this description, the signals 235 may include error or bias correction data generated by the GNSS receiver 200 using the ICARUS methods/algorithms taught herein to assist the other GNSS receiver or the GNSS receiver 200 in performing positioning calculations to provide a position solution 290 (e.g., including determining distances to satellites sending signals 205 by determining a cycle count and multiplying this by length of the signal's wavelengths).

In this regard, the processor 210 runs code/logic to provide the functionality of an estimator 240 operable to process the GNSS receiver data 262 and received GNSS receiver data 264 to provide a position solution 290 (e.g., by resolving integer ambiguity). Further, the processor 210 runs code/logic to provide the functionality of a cross ambiguity fixing module 250, and its functions include providing an error or bias correction for input to the estimator 240 in calculating the position solution 290 or for transmission to another GNSS receiver in signals 235 for input to its estimator to fix cross ambiguity.

To this end, the memory 260 of the GNSS receiver may store an error correction look up table (or receiver alignment database) 270. This table may include error or bias correction factors determined for specific or predefined pairs of GNSS receivers, and these factors may be generated by testing receivers to determine how each operates to calculate cycle counts for signals 205 (e.g., to resolve integer ambiguities) as this may differ among receiver types but in a consistent manner. Based on this testing, the table 270 can be created with error or bias corrections to facilitate use of two different types of receivers as base and roving receiver pairs (with either type used as the base station or the rover). The cross ambiguity fixing module 250 may process signals 235 to determine the type (e.g., brand or estimator design) of the GNSS receiver transmitting the signals 235, and this type information is used to lookup in table 270 a proper error or bias correction value for providing as input to the estimator 240 or to the estimator of the receiver paired with GNSS receiver 200 via signals 235. In the same or other embodiments, the memory 260 stores a search space 280 with expanded sets of DD ambiguities 282, and the search space 280 is generated by the cross ambiguity fixing module 250 for use by the estimator 240 in producing the position solution 290 by fixing cross-GNSS DD ambiguity as discussed herein.

In a conventional RTK process, a search space is formed for DD ambiguities by taking an independent reference satellite for each group of SD ambiguities belonging to a given signal on a given GNSS constellation or system. In contrast, the new ICARUS method involves forming a search space by selecting a single reference satellite for a larger group of SD ambiguities. The larger group of SD ambiguities may belong to different signals on different GNSS constellations with the only requirement being that they share the same nominal frequency.

Figure 3:
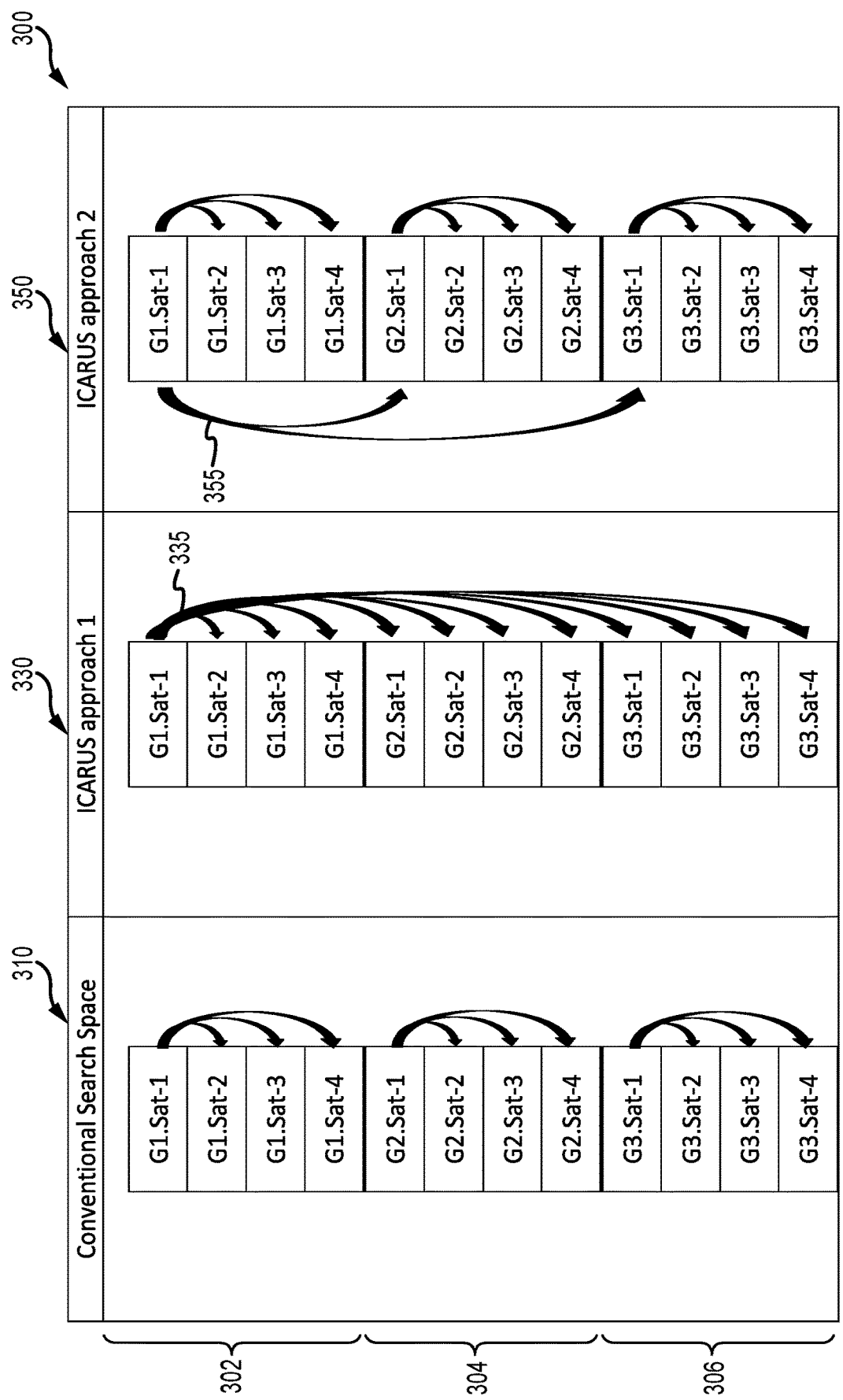
FIG. 3 illustrates a graphical representation of three different search spaces showing differences between a conventional RTK search space and two that may be formed using the method of resolving integer cross ambiguity described herein (as may be implemented by system of FIG. 1 and/or receiver of FIG. 2)

To suit particular estimator and/or linear algebra module designs, the ICARUS-generated search space may be built using different approaches not limited to the two presented below as examples to meet this requirement of sharing the same nominal frequency. FIG. 3 illustrates a graphical representation 300 of three different search spaces 310, 330, and 350 each formed for three GNSS signals (G1, G2, and G3) 302, 304, and 306 (which may be from the same or differing GNSS constellation), with four satellites (identified as Sat-1 through Sat-4) at each signal.

Search space 310 represents a conventional RTK search space for the three GNSS signals 302, 304, and 306. Search space 330 represents a first approach that may be used in an ICARUS method or algorithm. In this first approach, the receiver's logic (e.g., cross ambiguity fixing module 250 of FIG. 2) selects a reference satellite, such as randomly, e.g., Sat-1 of the first GNSS signal 302, and subtracts it from all other satellites of the first GNSS signal 302 and of the second and third GNSS signals 304 and 306 (as shown with arrows 335).

Search space 350 represents a second approach that may be used in an ICARUS method or algorithm. In this second approach, the receiver's logic (again, the cross ambiguity fixing logic or module) selects a reference satellite for each GNSS signal 302, 304, 306 (and this selection may be random), e.g., Sat-1 at each of the signals 302, 304, and 306. In contrast to conventional search space 310, though, the cross ambiguity fixing logic further acts to add DD ambiguity between one reference satellite (e.g., Sat-1 at the first GNSS signal 302) and the other reference satellites (e.g., Sat-1 at the second and third GNSS signals 304 and 306) (as shown with arrows 355).

Figure 4:
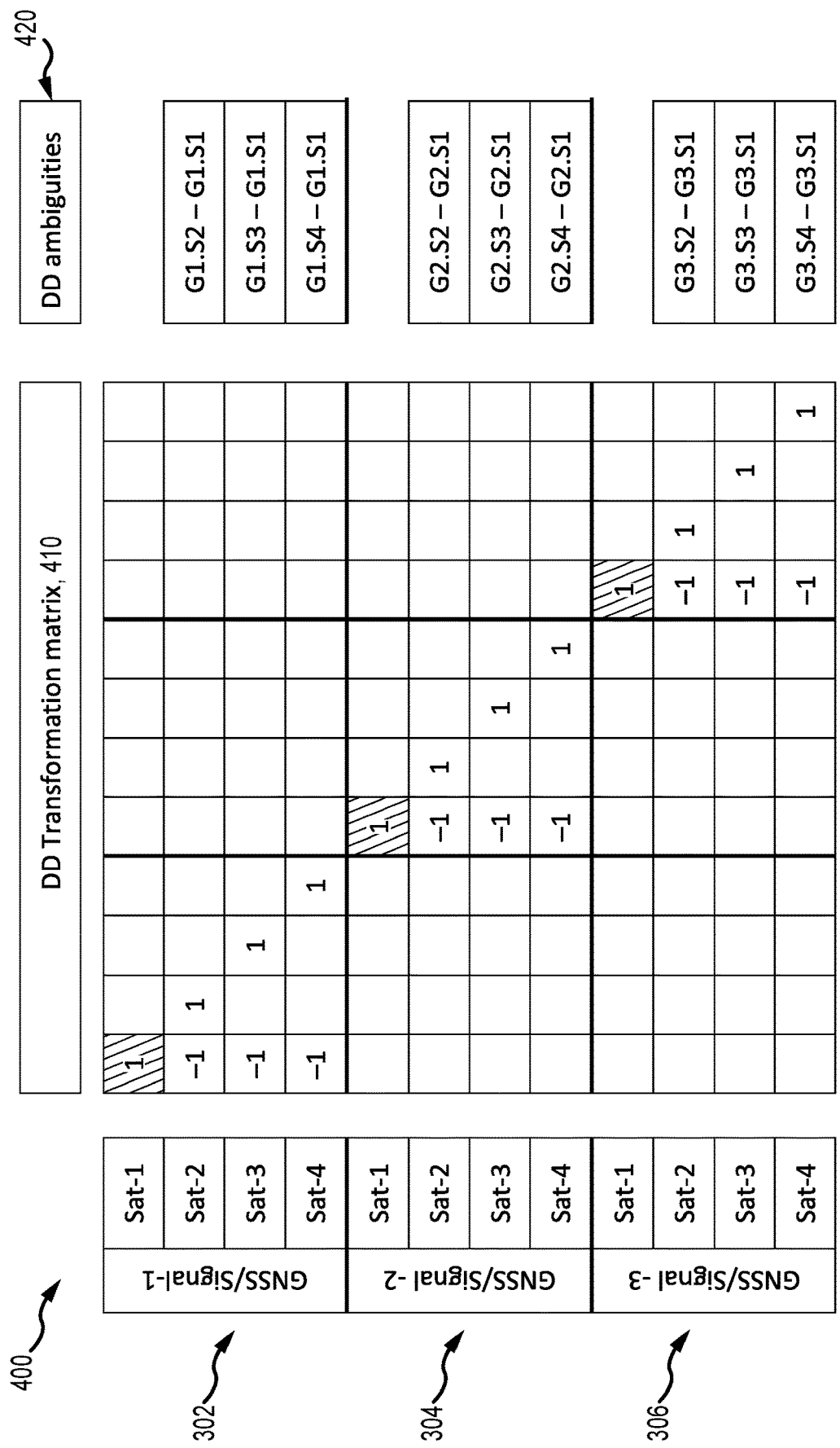
FIGS. 4-6 are graphical representations of generation of search spaces with DD ambiguities for conventional DD processing and for two useful approaches for implementing the method taught herein for integer cross ambiguity resolution for unified signals (or ICARUS)

The generation of the three search spaces 310, 330, 350 can be explained further with reference to the three corresponding DD transformation matrices. With this in mind, FIG. 4 illustrates with graphical representation 400 the generation of a search space for conventional DD processing. For GNSS signals 302, 304, and 306 and the four satellites at these signals, a DD transformation matrix 410 can be formed. From the matrix 410 and selection of the three reference satellites as shown with the shaded boxes, a set of DD ambiguities 420 can be produced or defined.

Figure 5:
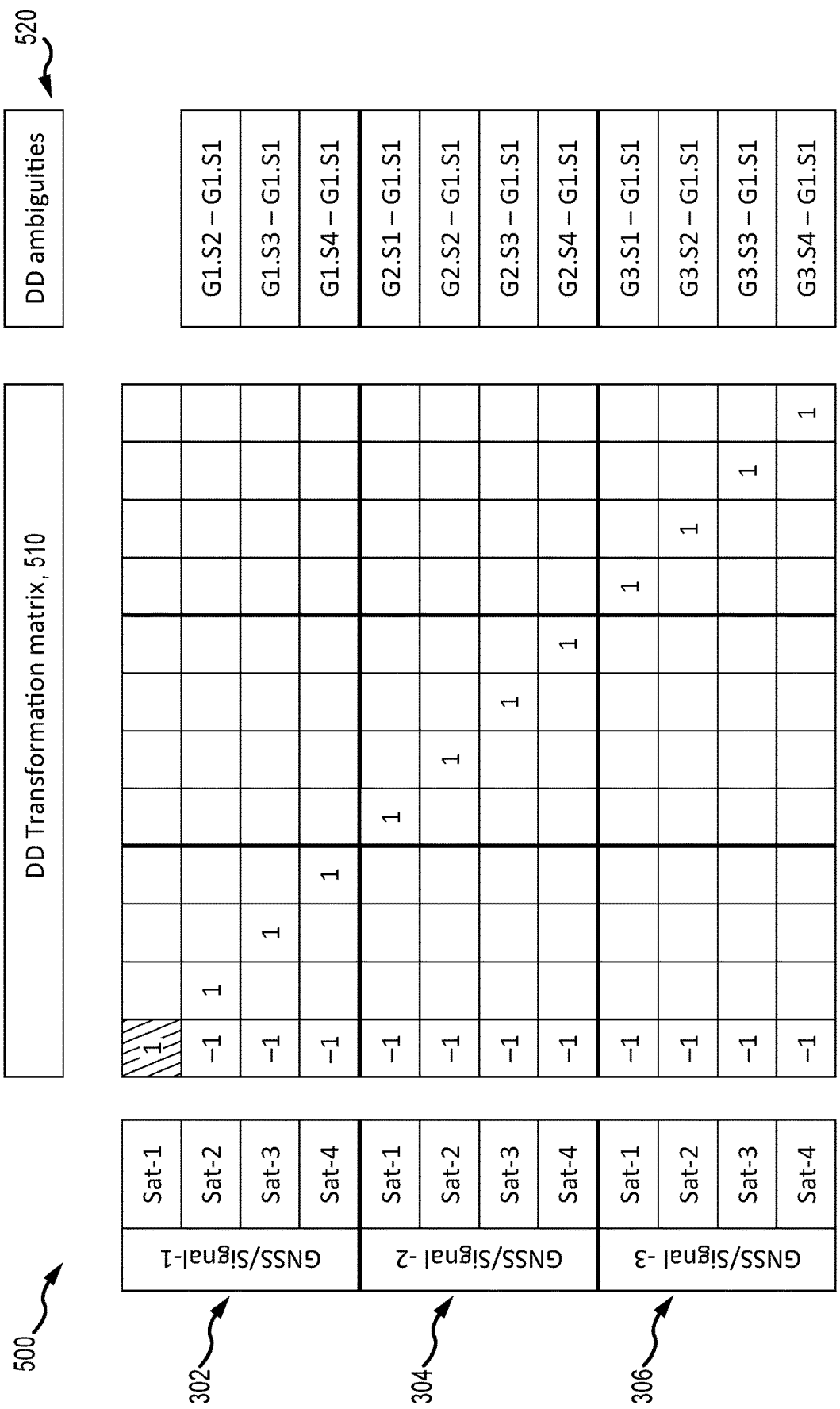

FIG. 5 illustrates with graphical representation 500 the generation of a search space for an estimator using the ICARUS method including fixing cross-GNSS DD ambiguity. The representation 500 corresponds with the first sample approach described above with reference to FIG. 3 and search space 330. For the GNSS signals 302, 304, and 306 and the four satellites at these signals, a DD transformation matrix 510 is formed. Then, from the matrix 510 and selection of one reference satellite for all three GNSS signals 302, 304, and 306 rather than one per GNSS signal, a set of DD ambiguities 520 can be produced or defined that includes a greater number of DD ambiguities than the conventional set 420 (e.g., two more DD ambiguities are in the search space in this non-limiting example). This increases precision even in harsh environments.

Figure 6:
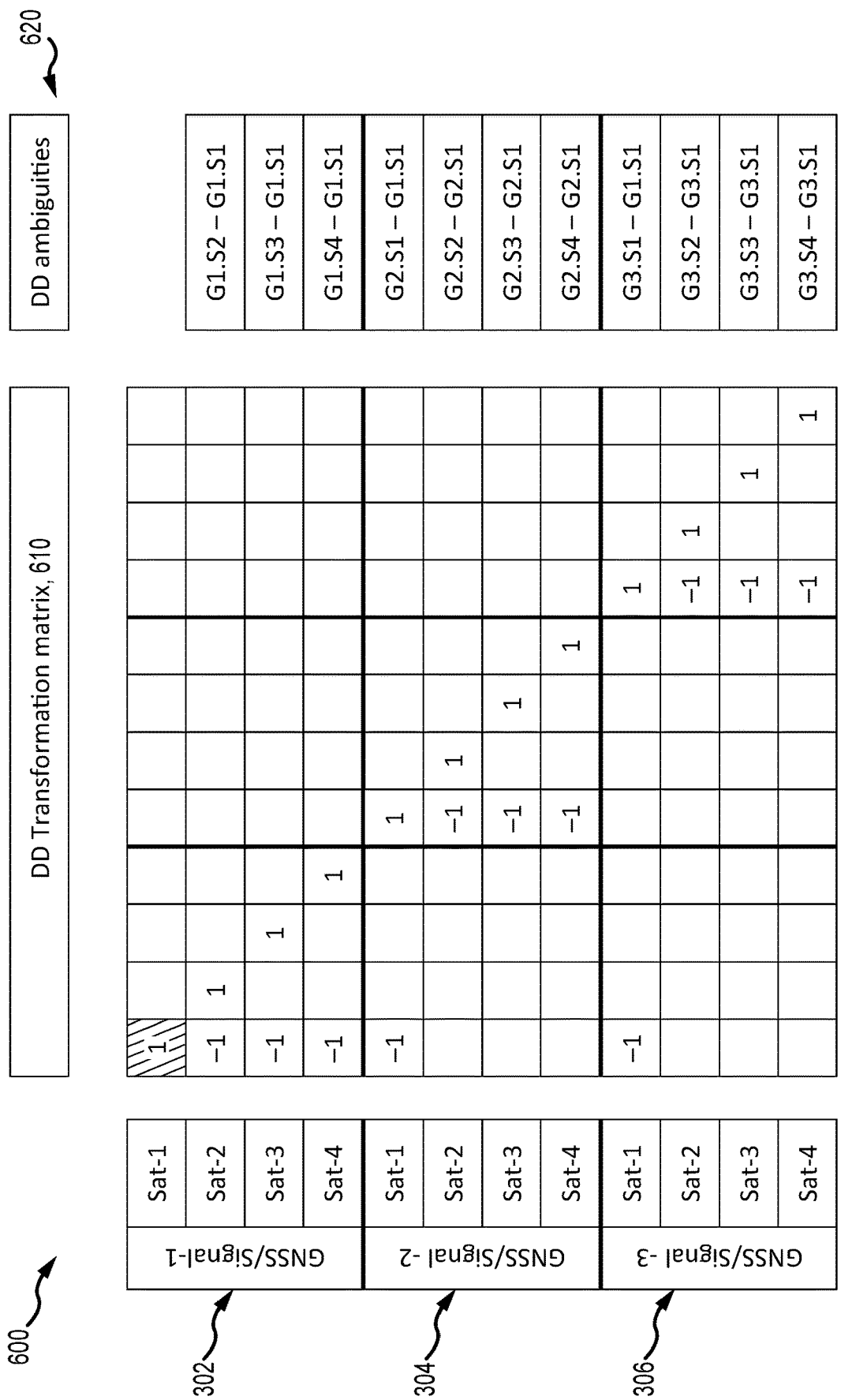

FIG. 6 illustrates with graphical representation 600 the generation of a search space for an estimator using the ICARUS method including fixing cross-GNSS DD ambiguity, and this corresponds with the second sample approach described above with reference to FIG. 3 and search space 350. For the GNSS signals 302, 304, and 306 and the four satellites at these signals, a DD transformation matrix 610 is formed. Then, from the matrix 610 and selection of an independent reference satellite for each signal 302, 304 and 306 (as done in FIG. 4) and adding DD ambiguity between the reference satellite (shown by shaded box) and other reference satellites, a set of DD ambiguities 620 can be produced or defined that includes a greater number of DD ambiguities than the conventional set 420 (e.g., two more DD ambiguities are in the search space in this non-limiting example).

Figure 7:
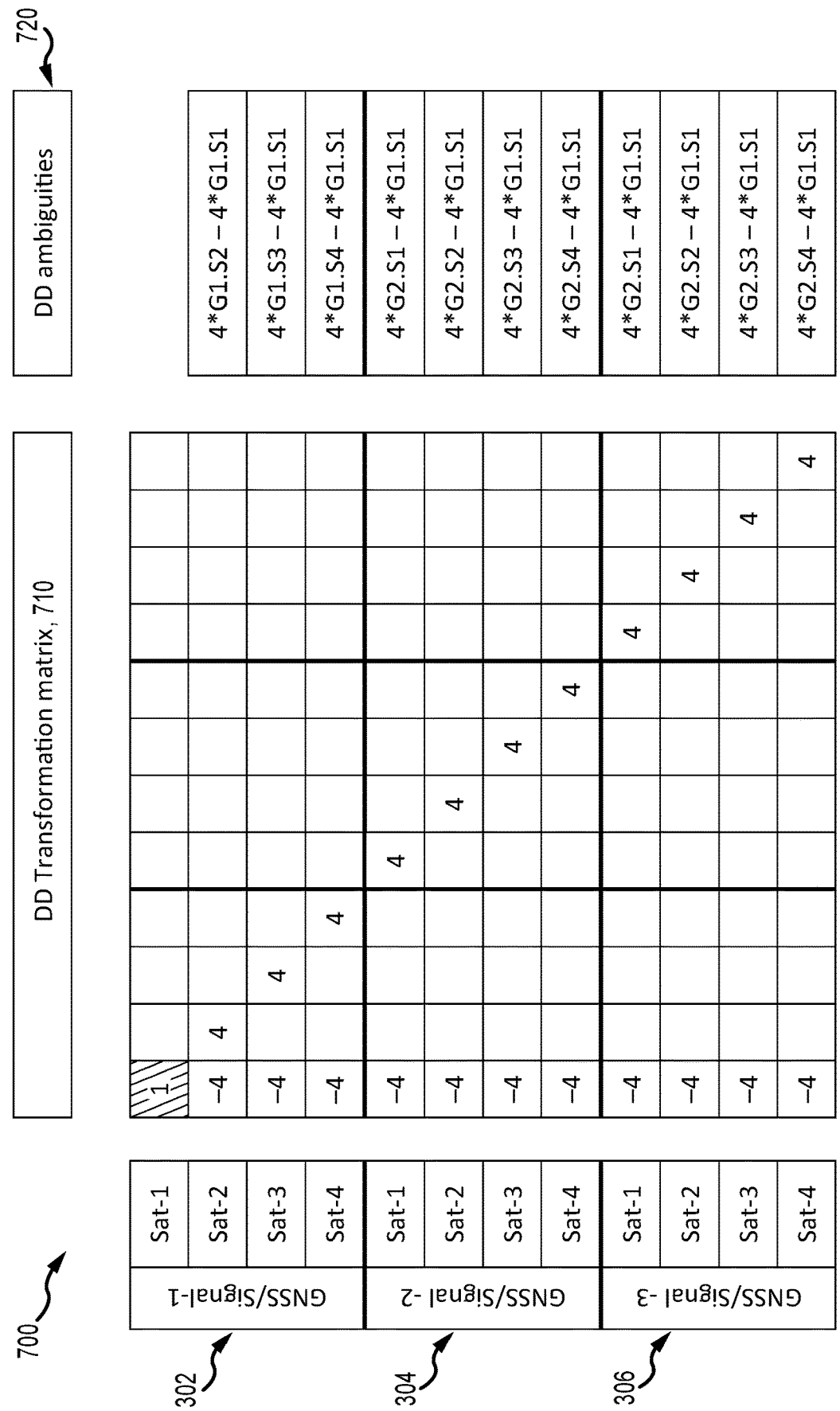
FIGS. 7 and 8 are graphical representations similar to those of FIGS. 5 and 6 for implementations of the methods for fixing cross-GNSS DD ambiguities using quarter-cycle ambiguities.

In some implementations of GNSS receivers, the cross ambiguity fixing logic may be adapted to perform an integer ambiguity search on a quarter-cycle grid. FIG. 7 illustrates with graphical representation 700 the generation of a search space for an estimator using the ICARUS method including fixing cross-GNSS DD ambiguity with this new search technique. For the GNSS signals 302, 304, and 306 and the four satellites at these signals, a DD transformation matrix 710 is formed with quarter-cycle ambiguities. Then, from the matrix 710 and selection of one reference satellite for all three GNSS signals 302, 304, and 306 rather than one per GNSS signal, a set of DD ambiguities 720 can be produced or defined that includes a greater number of DD ambiguities than the conventional set 420 (e.g., two more DD ambiguities are in the search space in this non-limiting example).

Such a search may benefit by augmentation with the following additional verifications: (a) for any 'j' we have (4*G1.Sj−4*G1S1)=0 (mod 4); in other words, ambiguities for a GNSS signal to which reference satellite corresponds to are to be integer; and (b) for any 'I', T, and 'k' we have (4*Gi.Sj−4*G1.S1)−(4*Gi.Sk−4*G1.S1)=0 (mod 4). In other words, all satellites on a given GNSS signal should have identical quarter-cycle misalignment. Such a verification of a "common quarter cycle level within each GNSS signal" may be considered as an additional quality indicator for ambiguity candidates and may be a good source for detection of bad satellites. Such information may be used in a partial ambiguity search and/or used to increase reliability of solution by the logic of the GNSS receiver.

Figure 8:
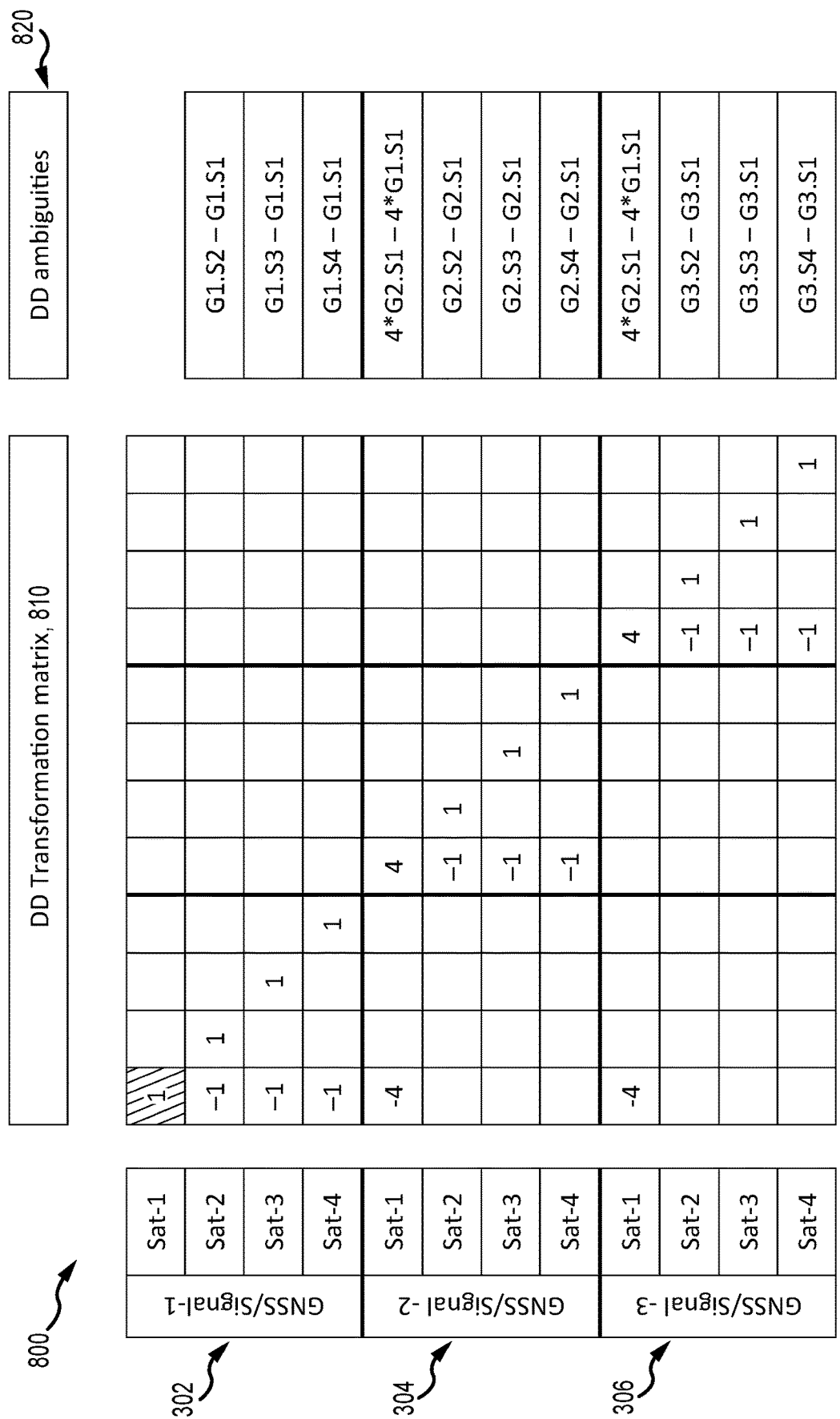

Use of quarter-cycle ambiguities may also be used in the ICARUS approach discussed with reference to FIG. 6. For example, FIG. 8 illustrates with graphical representation 800 the generation of a search space for an estimator using the ICARUS method including fixing cross-GNSS DD ambiguity with a combination of quarter-cycle ambiguities and added DD ambiguities. For the GNSS signals 302, 304, and 306 and the four satellites at these signals, a DD transformation matrix 810 is formed with quarter-cycle ambiguities. Then, from the matrix 810 and selection of an independent reference satellite for each signal 302, 304 and 306 (as done in FIG. 4) and adding DD ambiguity between the reference satellite (shown by shaded box) and other reference satellites (as done in FIG. 6), a set of DD ambiguities 820 can be produced or defined that includes a greater number of DD ambiguities than the conventional set 420 (e.g., two more DD ambiguities are in the search space in this non-limiting example).

Figure 9:
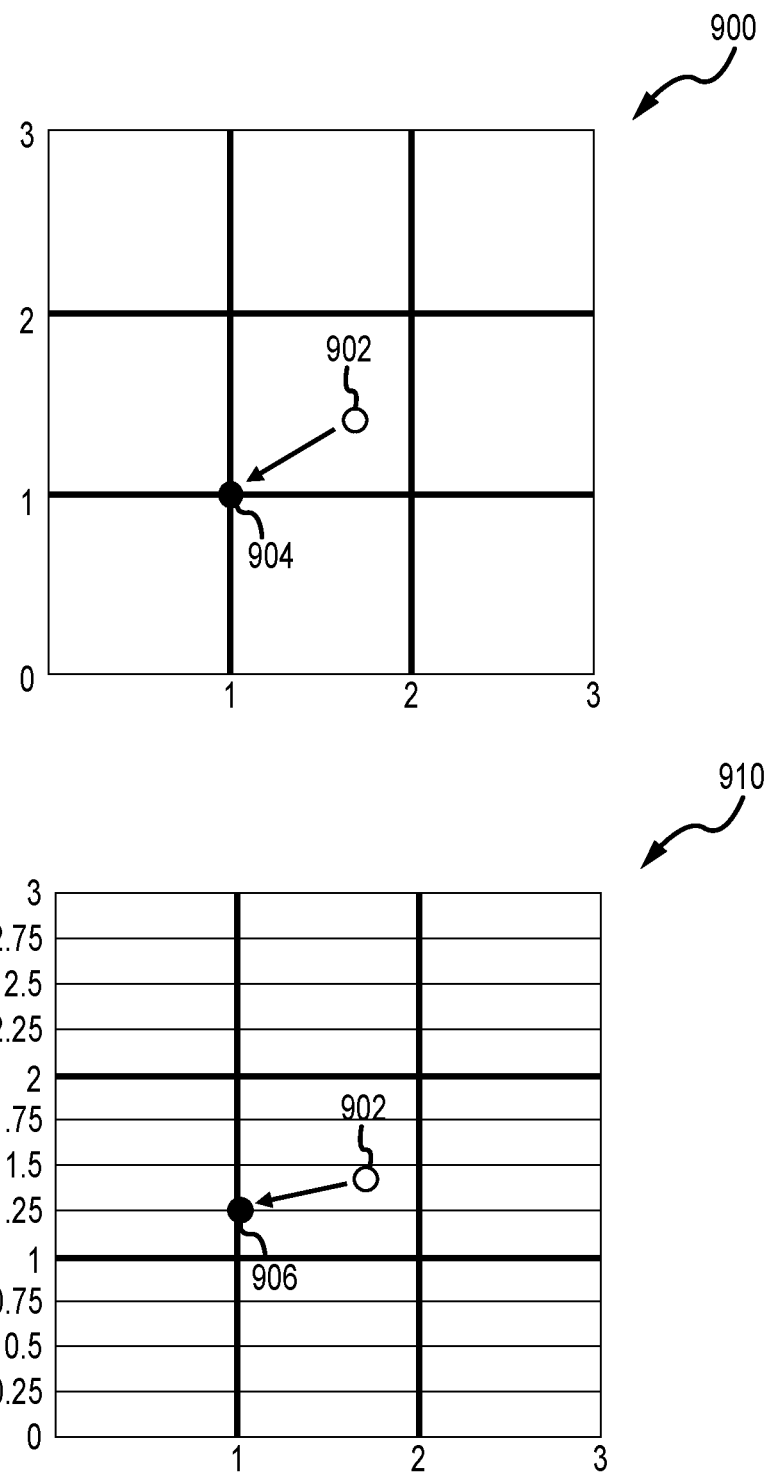
FIG. 9 illustrates an integer grid and a mixed grid during use in an ambiguity search as may be performed as part of performing the ICARUS method of the present description.

FIG. 9 illustrates an integer grid 900 and a mixed grid 910 during their use in an ambiguity search as may be performed as part of performing the ICARUS method of the present description. FIG. 9 is presented because a search on a quarter-cycle grid can be explained readily with a two-dimensional example. On an integer grid 900 (both X and Y axes are integer), dot 902 represents a float DD ambiguity while the search produces the dot 904 representing the best integer candidate for a given DD ambiguity. In contrast, this same search can be performed on a mixed grid 910 with an integer grid for the X-axis and a quarter-cycle grid for the Y-axis. As shown, the dot 902 representing a float DD ambiguity can be used to search for the best candidate that now is not an integer. However, the inventors propose a technique of multiplying the search space by four to allow the logic of the receiver to perform the search on the quarter-cycle grid 910 yet utilize a standard integer ambiguity search procedure.

Figure 10:
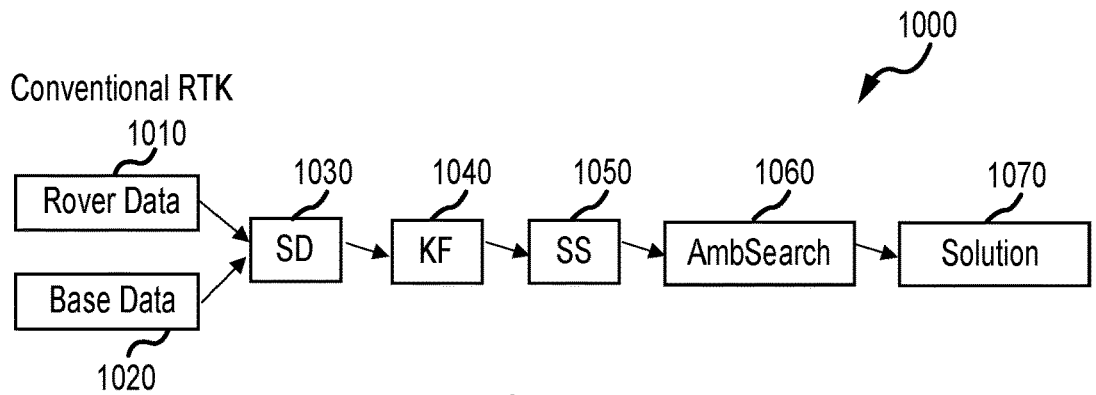
FIG. 10 is a functional block diagram of logic and data flow of a GNSS receiver during performance of conventional RTK process.

FIG. 10 is a functional block diagram of logic and data flow of a GNSS receiver 1000 during performance of conventional RTK process. An estimator and/or additional logic of the GNSS receiver 1000 is provided for generating a position solution 1070 (which includes a cycle count for received signal(s) to obtain distance(s) to visible satellites of one or more GNSS constellations). During a conventional RTK process (e.g., DD differential process to obtain a cycle count/position solution 1070), a block 1030 forming single difference observations (i.e., rover minus base to remove satellite to receiver errors) receives as input rover data 1010 and base data 1020. The SD observations are passed to a Kalman Filter (KF) block 1040 for further processing. The output of the KF block 1040 is provided as input to a search space (SS) block 1050 that forms a search space for use in an ambiguity search. The RTK processing for a conventional GNSS receiver 1000 continues with the search space provided to a block 1060 with logic to perform an integer ambiguity search and generating a solution 1070.

Figure 11:
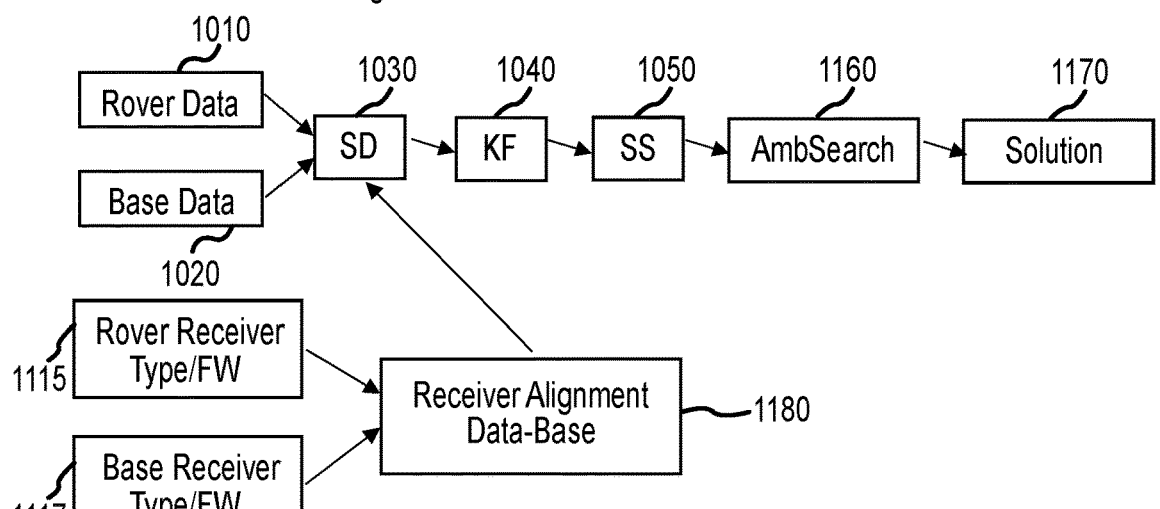
FIG. 11 is a functional block diagram, similar to FIG. 10, of logic (e.g., an estimator and cross ambiguity fixing module) and data flow according to the present description with known alignment information.

FIG. 11 is a functional block diagram, in contrast, of logic (e.g., an estimator and cross ambiguity fixing module) and data flow according to the present description with known alignment information. In FIG. 11, the GNSS receiver 1100 is performing an ICARUS method with known alignment information. The GNSS receiver 1100 may use similar logic (e.g., estimator techniques) to obtain a solution as shown with like numbered blocks 1030, 1040, and 1050. The ambiguity search block 1160 is differently numbered to stress that the search will produce a different solution 1170 (e.g., more precise solution) in GNSS receiver 1100 although similar search processes may be followed in block 1160 as differing input (search space) is provided by block 1050.

To this end, the GNSS receiver 1100 is shown to include in its memory a receiver alignment database 1180 that provides input to the SD block 1030 for use in finding solution 1170. The database 1180 may be formed by obtaining and processing (such as through testing) different types (e.g., brands from different manufacturers and/or devices with differing estimator logic and the like) of GNSS receivers and how they process signal data (e.g., rover and base data 1010 and 1020) to obtain a solution (e.g., how they determine integer ambiguity in positioning calculations). This data is processed to obtain error or bias correction data for pairs of GNSS receiver types so that each pairing of the same or differing types of GNSS receivers can more accurately be used together to obtain a DD solution 1170.

Then, in the ICARUS method performed by operating GNSS receiver 1100, rover receiver type data 1115 and base receiver type data 1117 is used by the GNSS logic (e.g., the cross ambiguity fixing module) to access the database 1180 to retrieve error or bias correction data or values (or, more simply, "error or bias correction") that is passed to the SD block 1030 (or an estimator or similar logic) as input with the rover and base data 1010, 1020 (satellite signal data). With this additional input from the database 1180, the blocks 1030, 1040, and 1050 operate to generate data that is used by the block 1160 in creating a search space and for performing an integer ambiguity search (or best fit iterative process) to obtain the solution 1170.

Figure 12:
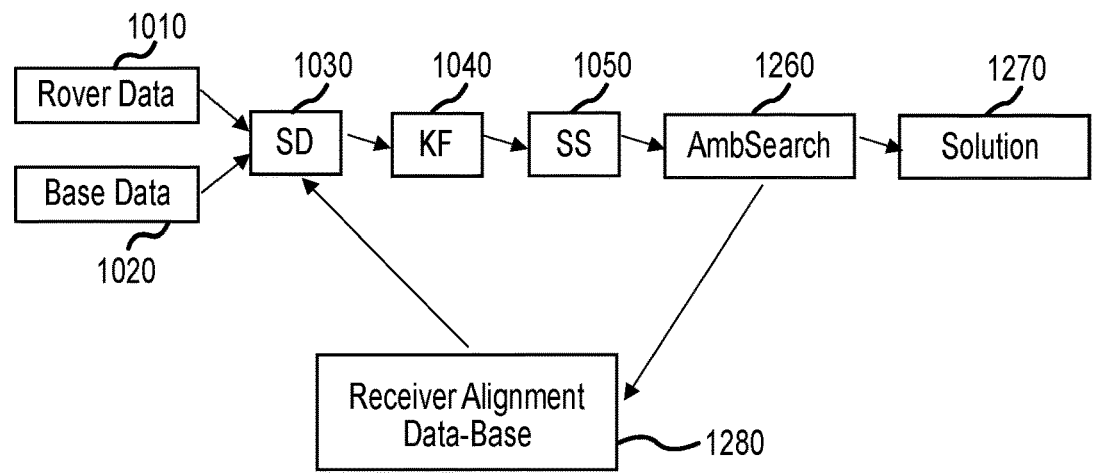
FIG. 12 is a functional block diagram, similar to FIG. 11, of logic (e.g., an estimator and cross ambiguity fixing module) and data flow according to the present description with estimated (and validated) alignment information.

FIG. 12 is a functional block diagram, similar to FIG. 11, of logic (e.g., an estimator and cross ambiguity fixing module) and data flow according to the present description. In FIG. 12, the GNSS receiver 1200 is performing an ICARUS method with estimated and validated alignment information. The GNSS receiver 1200 uses similar logic (e.g., estimator techniques) to obtain a solution as shown with like numbered blocks 1030, 1040, and 1050. The ambiguity search block 1260 is differently numbered to stress that the search will produce a different solution 1270 (e.g., more precise solution) in GNSS receiver 1200 although similar search processes may be followed in block 1260 as differing input (search space) is provided by block 1050.

To this end, the GNSS receiver 1200 is shown to include in its memory a receiver alignment database 1280 that provides input to the SD block 1030 for using in finding solution 1270. The database 1280 may be used to store error or bias correction data or values for fixing cross ambiguity as taught herein during DD RTK processing in GNSS receiver 1200. In some cases, the database 1280 will provide error or bias correction values that are input to block 1030 for use in generating larger search spaces with greater numbers of DD ambiguities as candidates for the solution 1270.

With reference to FIG. 12, it should be clear that in using the techniques described herein that unknown cross ambiguity biases (0, +/−0.25, or 0.5 cycle) are estimated with help of an ambiguity search procedure on a quarter-cycle grid. In some alternative implementations, though, the following method may be implemented by the software of the receiver(s). A conventional search is performed, which allows float bias between reference ambiguities on different GNSS/signals. This is followed by calibration and verification of inter-GNSS/signal biases. Then, the alternative method continues with fixing the biases to confirm values on a quarter-cycle grid. Next, the alternative method includes applying those confirmed values to the data as described with reference to FIG. 11.

In order to better understand where potential carrier phase quarter-cycle or half-cycle misalignment comes from, one can review the phase alignment information in Table 1 (which provides information from Table A23 from RINEX Version 3.04 Appendix). It should be noted that for conventional RTK processing these corrections may not be essential because the same value being added to all carrier-phase observations on a given GNSS signal still cancels out upon conventional DD information (e.g., when an independent reference satellite is selected for each GNSS signal). For the ICARUS method, these alignments are more important. This is because not knowing the phase relationship with respect to this alignment one would not be able to guarantee integer cross-GNSS DD and would have to consider a quarter-cycle grid as shown in the examples herein.

At this point in the description, it may be useful to describe testing and research performed by the inventors that provided or identified a number of different biases in cross ambiguities for different types of GNSS receivers. In a zero baseline test, a set of receivers from six manufacturers were used. The following data was collected for each GNSS receiver: (a) raw data in own vendor format; (b) respective RINEX-3.0x files; and (c) RTCM-3.2 MSM4 streams. The test proved that there is a half cycle bias in L2 GPS/QZSS cross ambiguity between different receiver vendors (or receiver types) such as between the Manufacturer 2 and Manufacturer 4 receivers (or between a first GNSS receiver that is a first type and a second GNSS receiver of a second type differing from the first type).

With regard to GPS/SBAS cross ambiguity, the inventors analyzed a number of different data records, and, in all cases, a single type of GNSS receiver was used (i.e., a Spectra SP90m) when taking DD to generate the following table of results.

TABLE 3

GPS/SBAS Cross Ambiguity Test Results

| Vendors | Used RINEX signal names (SBA/GPS) | Cross DD carrier bias, Cycle |
| --- | --- | --- |
| Manufacturer 1 - Spectra | 1C/1C - 1C/1C | 0 |
| Manufacturer 2 - Spectra | 1C/1C - 1C/1C | 0.5 |
| Manufacturer 3 - Spectra | 1C/1C - 1C/1C | 0 |
| Manufacturer 4 - Spectra | 1C/1C - 1C/1C | 0 |
| Manufacturer 5 - Spectra | 1C/1C - 1C/1C | 0 |
| Manufacturer 6 - Spectra | 1C/1C - 1C/1C | 0.5 |

This incompatibility between differing types of GNSS receivers when performing DD processing of satellite signals in a receiver pair (a rover and a base station) was known for the past few years, and, before the present invention(s), this prevented using SBAS ranging with mixed receiver types, which limited receiver use to internal-heading operation. With L1/L5 capability and up to eight SBAS satellites tracked simultaneously, SBAS can be a very important RTK player. SBAS ranging messages (i.e., MSM) are already standardized in RTCM-3.2. The inventors studied the interoperability issue for GNSS receivers and determined it was likely that different GNSS receiver vendors differently interpret SBAS carrier polarity with regard to Viterbi decoding. Further, they determined that it is doubtful that there can be an absolutely correct interpretation of SBAS carrier polarity at this time such that the interoperability issue will likely remain for the next few years at least.

With regard to L1 and L5 GPS/GAL cross ambiguity, the inventors performed testing with a single type of receiver (Spectra's GNSS receiver) used as a reference receiver in a rover-base station pair while taking DD and with differing types of GNSS receiver differenced against the reference receiver. The following tables, with Table 4 for L1 and Table 5 for L5, show the results of this interoperability test (with RINEX names provided as vendors specified in the RINEX files and RTCM-3 streams).

TABLE 4

L1 GPS/GAL Cross Ambiguity Test Results

| Vendors | Used RINEX signal names (GPS/GAL) | Cross DD carrier bias. Cycle |
|---|---|---|
| Manufacturer 1 - Spectra | 1C/1X - 1C/1C | 0 |
| Manufacturer 2 - Spectra | 1C/1X - 1C/1C | 0.5 |
| Manufacturer 3 - Spectra | 1C/1C - 1C/1C | 0.5 |
| Manufacturer 4 - Spectra | 1C/1C - 1C/1C | 0 |

TABLE 5

L5 GPS/GAL Cross Ambiguity Test Results

| Vendors | Used RINEX signal names (GPS/GAL) | Cross DD carrier bias, cycle |
|---|---|---|
| Manufacturer 1 - Spectra | 5X/5X - 5Q/5Q | 0.5 |
| Manufacturer 2 - Spectra | 5X/5X - 5Q/5Q | 0 |
| Manufacturer 3 - Spectra | 5Q/5Q - 5Q/5Q | 0 |

As one can see from Tables 4 and 5, there is an ambiguity about the relative polarity of carrier phase (i.e., 0.5 cycle bias in cross ambiguity) between different vendors and GNSS receiver types. It may be caused by incorrect signal adjustment requested by RTCM (see Table 1), e.g., using incorrect sign when applying rotation of 5Q to 5I and/or 5X to 5I.

With regard to L5 GPS/IRNSS/SBAS cross ambiguity, the results of testing of different types of GNSS receivers in a base station and rover pair are shown below in Table 6. The bias of plus or minus quarter cycle is caused by obvious misalignment of Spectra 5Q carrier to 5I carrier (as RTCM requires). Taking this correction into account virtually, the inventors concluded that a GPS-SBAS L5 combination is half cycle incompatible between the two tested types of receivers (Spectra and Trimble receivers), which is the same as GPS-SBAS L1 combination. This proves once more that between GNSS systems, biases exist because many vendors attempt to comply with RTCM standards for cycle calculations and processing of satellite signals differently.

TABLE 6

L5 GPS/IRNSS/SBAS Cross Ambiguity Test Results

| Signals (Manf. 2/Spectra) | Reference signals (Manf. 2/Spectra) | DD carrier bias (cycle) |
|---|---|---|
| IRNSS L5 (5A/5A) | GPS (5X/5Q) | −0.25 |
| SBAS L5 (5I/5I) | GPS (5X/5Q) | 0.25 |

With regard to L2 GAL E5b/BDS B2 cross ambiguity, GAL E5b and BeiDou B2 share the same frequency, and the inventors performed tests with pairs of receivers taking DD. These results proved to the inventors that there is a bias of about a quarter cycle in cross ambiguity, which may be due, again, to different implementation of the industry standards such as the RTCM requirements.

Additional testing performed by the inventors included testing of receivers for QZSS L1 self-compatibility and for the Manufacturer 5 receivers (such as against another type of receiver such as Manufacturer 7). These tests also show issues including GPS L1 carrier alignment and cross ambiguity between GPS L1 and GAL E1, respectively.

From the testing and other research by the inventors, the inventors reached a number of conclusion and concepts for designing new logic for GNSS receivers. There are a lot of cross-GNSS double difference (DD) carrier combinations (between different GNSS occupying the very same carrier frequency) which are potentially integer. At the same time, because of lack of standardization (and/or different following of industry standards), the fractional part of these combinations can be half an integer or even quarter an integer. RTK/PPP solutions will be obviously benefitted (especially in shaded areas when each extra DD matters) if such combinations can be integer. With current ambiguity, a wise RTK/PPP rover with logic performing the ICARUS methods/algorithms taught herein can win against others such as by properly using extra not yet standardized combinations shown herein.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

With the above description in mind, it may be useful to the reader to provide a review of some of the technical features provided in a receiver implementing the ICARUS method(s), and all or a subset of these features are called out for protection in the following claims.

The RTK operation is a well-known technique. PPP is also known but to a lesser degree in the industry. The new method(s) taught herein covers both RTK and PPP if they operate with ambiguity search procedures. The inventive method can be applied equally to real-time operation in the receiver, real-time operation in the cloud, or post-processing on a computing device. Further, the new method may be implemented in physical and virtual receivers, where the base and/or the rover could be physical or virtual, constructed based on the data from multiple base stations or constructed based on some set of state-space corrections (e.g., original correcting data used for PPP).

To implement ICARUS techniques, each GNSS is controlled by the same clock, which is a well-known and understood case for high-end receivers. Integer Ambiguity Resolution (IAR) is a well-known technique, and there are various implementations. Some IAR implementations search for a single integer candidate while some search for multiple integer candidates and compute a weighted sum of those. The ICARUS techniques equally apply to all these cases or IAR implementations.

The search space (on which IAR is performed) is constructed as a set of DD carrier-phase ambiguities, which is a well-known technique. It is well acknowledged in the industry that a larger search space allows one to perform faster and more reliable IAR. To this end, the methods taught herein include an approach which allows making the search space larger by: (a) selecting a common reference satellites for different GNSS/Signals, which are transmitted on the same nominal frequency or (b) including into the search space the DD between reference satellites, which correspond to GNSS/Signals, which are transmitting on the same nominal frequency.

Both of these technical approaches work with any ambiguity resolution technique provided that the base and rover receivers are of the same type, e.g., when all phase measurements have identical polarity and quarter-cycle alignment to each other. Further, when two receivers are of different types, the ICARUS techniques can still be applied with the following modifications: (a) if both receivers are of known types, corresponding mis-alignment values (0.0, 0.25, −0.25, 0.5) can be derived from the database and applied prior to using the data; (b) a search can be performed on a fully or partially quarter-cycle grid to account for a possible quarter-cycle misalignment; (c) having successful ambiguity resolution from Step (b) the estimated mis-alignment information can be saved and applied to the data prior to processing, thus on-the-fly switching to case or Step (a); and (d) a conventional search can alternatively be performed (which allows float bias between reference ambiguities on different GNSS/Signals) followed by calibration and verification of inter-GNSS/Signal biases, by fixing them to confirmed value on a quarter-cycle grid, and by applying those to the data as described in case or Step (a).

We claim:

1. A receiver for processing satellite signals with integer cross ambiguity resolution, comprising:
   an antenna assembly receiving signals from a set of Global Navigation Satellite System (GNSS) satellites;
   a transceiver establishing a communication link with a spaced-apart GNSS receiver and receiving data from the spaced-apart GNSS receiver;
   a processor;
   a cross ambiguity fixing module provided by the processor executing code to generate an error correction;
   an estimator provided by the processor executing code to provide a geographical position solution by processing the data from the spaced-apart GNSS receiver and the signals from the set of GNSS satellites along with the error correction; and
   memory storing an error correction lookup table storing error correction values for a plurality of pairs of receiver types,
   wherein the data from the spaced-apart GNSS receiver includes a definition of a type of GNSS receiver, and
   wherein the cross ambiguity fixing module generates the error correction by retrieving one of the error correction values based on the definition of the type of GNSS receiver and on a type of the receiver.

2. The receiver of claim 1, wherein the geographical position solution is obtained by the estimator performing double difference (DD) processing to resolve integer ambiguity.

3. The receiver of claim 1, wherein the retrieved one of the error correction values is communicated over the communication link to the spaced-apart GNSS receiver for input in performing DD positioning to obtain a position solution for the spaced-apart GNSS receiver.

4. The receiver of claim 1, wherein the error correction is selected from the group consisting of: 0 cycle bias, +/−0.25 cycle bias, and 0.5 cycle bias.

5. The receiver of claim 1, wherein the receiver and the spaced-apart GNSS receiver make up a base station and rover pair of GNSS receivers operating to perform DD processing.

6. The receiver of claim 1, wherein the error correction includes a search space for use in DD processing by the estimator.

7. The receiver of claim 6, wherein the search space includes a greater number of DD ambiguities than a conventional Real-Time Kinematic (RTK) search space.

8. The receiver of claim 6, wherein the search space is formed by selecting a single reference satellite for a group of single difference (SD) ambiguities associated with satellite signals having a predefined nominal frequency.

9. The receiver of claim 8, wherein the satellite signals include at least two different signals on at least two different GNSS constellations.

10. The receiver of claim 6, wherein the search space is formed by selecting one reference satellite for each GNSS signal from the plurality of GNSS satellites and adding DD ambiguity between each pair of the reference satellites.

11. The receiver of claim 10, wherein the search space is defined to allow a quarter-cycle ambiguity for the DD ambiguity.

12. The receiver of claim 6, wherein the search space is defined as a quarter-cycle grid and the geographical position solution is determined in part by performing an integer ambiguity search on the quarter-cycle grid.

13. A receiver for processing satellite signals with integer cross ambiguity resolution, comprising:
   a processor;
   a cross ambiguity fixing module provided by the processor executing code to generate an error correction; and
   an estimator provided by the processor executing code to provide a geographical position solution by processing signals from a set of GNSS satellites along with the error correction and with receiver data received from a spaced-apart GNSS receiver, wherein the geographical position solution is obtained by the estimator performing double difference (DD) processing to resolve integer ambiguity, wherein the error correction includes a search space for use in DD processing by the estimator, and wherein the search space includes a greater number of DD ambiguities than a conventional Real-Time Kinematic (RTK) search space or a Precise Point Positioning (PPP) search space; and
   memory storing an error correction lookup table storing error correction values for a plurality of pairs of receiver types,
   wherein the data from the spaced-apart GNSS receiver includes a definition of a type of GNSS receiver, and
   wherein the cross ambiguity fixing module generates the error correction by retrieving one of the error correction values based on the definition of the type of GNSS receiver and on a type of the receiver.

14. The receiver of claim 13, wherein the search space is formed by selecting a single reference satellite for a group of single difference (SD) ambiguities associated with satellite signals having a predefined nominal frequency and wherein the satellite signals include at least two different signals on at least two different GNSS constellations.

15. The receiver of claim 13, wherein the search space is formed by selecting one reference satellite for each GNSS signal from the plurality of GNSS satellites and adding DD ambiguity between each pair of the reference satellites.

16. The receiver of claim 15, wherein the search space is defined to allow at least one of a quarter-cycle ambiguity and a half-cycle ambiguity for the DD ambiguity.

17. The receiver of claim 13, wherein the search space is defined as a quarter-cycle grid or as a half-cycle grid and the geographical position solution is determined in part by performing an integer ambiguity search on the quarter-cycle grid or the half-cycle grid.

18. A method for processing satellite signals with integer cross ambiguity resolution, comprising:
receiving signals from a set of Global Navigation Satellite System (GNSS) satellites, wherein the receiving step is performed by a first receiver of a first type and a second receiver of a second type differing from the first type;
constructing a search space comprising a set of DD carrier-phase ambiguities; and
performing integer ambiguity resolution by processing the search space, wherein the constructing step includes enlarging, prior to the performing of the integer ambiguity resolution step, the search space by performing one of the following steps: selecting a common reference satellite for different pairs of the received signals from the set of GNSS signals; and including in the search space DD ambiguities between reference satellites that correspond to the received signals from the set of GNSS satellites;
deriving misalignment values from a database of receiver alignment data, wherein the misalignment values between the first and second receivers are 0.0, 0.25, −0.25, or 0.5;
searching on a quarter-cycle grid to account for a potential quarter-cycle misalignment and to provide an ambiguity resolution; and
when the ambiguity resolution is successfully determined in the searching on the quarter-cycle grid, applying the misalignment values to the received signals from the GNSS satellites prior to performing the integer ambiguity resolution.

19. The method of claim 18, wherein the method is performed in real-time operations of a GNSS receiver, in real-time operations in a cloud-based processing environment, or in post-processing on a computing device.

20. The method of claim 18, wherein the different pairs of the received signals from the set of GNSS signals are transmitting on a matching nominal frequency and wherein the reference satellites are transmitting on a matching nominal frequency.

21. The method of claim 18, wherein the receiving step is performed by a first receiver and a second receiver of a single type, whereby phase measurements have identical polarity and quarter-cycle alignment to each other.

22. The receiver of claim 13, wherein the retrieved one of the error correction values is communicated to the spaced-apart GNSS receiver for input in performing DD positioning to obtain a position solution for the spaced-apart GNSS receiver.

* * * * *